(12) United States Patent
Schuler et al.

(10) Patent No.: US 7,549,355 B2
(45) Date of Patent: Jun. 23, 2009

(54) ROTARY LEADTHROUGH OF A ROBOT ARM

(75) Inventors: Samuel Schuler, Zürich (CH); Martino Filippi, Löhningen (CN)

(73) Assignee: Robert Bosch GmbH, Stuttgart (DE)

( * ) Notice: Subject to any disclaimer, the term of this patent is extended or adjusted under 35 U.S.C. 154(b) by 315 days.

(21) Appl. No.: 10/580,153

(22) PCT Filed: Nov. 19, 2004

(86) PCT No.: PCT/DE2004/002554

§ 371 (c)(1), (2), (4) Date: May 19, 2006

(87) PCT Pub. No.: WO2005/053914

PCT Pub. Date: Jun. 16, 2005

(65) Prior Publication Data

US 2007/0137374 A1    Jun. 21, 2007

(30) Foreign Application Priority Data

Dec. 2, 2003   (CH) .................................... 2050/03

(51) Int. Cl.
*B25J 17/02*    (2006.01)

(52) U.S. Cl. ...................... 74/490.06; 901/29

(58) Field of Classification Search .................. 464/22, 464/170; 74/490.05, 490.06, 609; 414/729, 414/735; 403/355, 408.1; 901/28, 29
See application file for complete search history.

(56) References Cited

U.S. PATENT DOCUMENTS

| 4,210,213 A | * | 7/1980 | Louviere .................. 74/609 X |
| 5,271,686 A | * | 12/1993 | Herring et al. ................. 901/29 |
| 6,301,525 B1 | * | 10/2001 | Neumann ............... 414/729 X |
| 6,795,750 B2 | * | 9/2004 | Kullborg ............. 74/490.06 X |
| 7,188,544 B2 | * | 3/2007 | Persson et al. ................ 901/28 |
| 2001/0019692 A1 | | 9/2001 | Ehrat |
| 2003/0064816 A1 | | 4/2003 | Schuler |
| 2003/0121350 A1 | | 7/2003 | Hvittfeldt et al. |

FOREIGN PATENT DOCUMENTS

| EP | 1 129 829 A1 | 9/2001 |
| EP | 1 293 691 A1 | 3/2003 |
| JP | 1-199497 | 8/1989 |
| JP | 4-203529 | 7/1992 |
| JP | 2003-175485 | 6/2003 |
| WO | WO 01/60571 A1 | 8/2001 |

* cited by examiner

*Primary Examiner*—Greg Binda
(74) *Attorney, Agent, or Firm*—Ronald E. Greigg

(57) ABSTRACT

A rotary leadthrough of a robot arm, in particular of a fourth axle of a Delta robot, has a housing and a shaft, located in an axial leadthrough of the housing and supported rotatably in this housing, for connection to the robot arm. The housing has at least two openings for cleaning the axial leadthrough. The shaft at least in a portion of its length, has a diameter which is less than the diameter of the axial leadthrough in that region, so that there is a void between the shaft and the axial leadthrough.

20 Claims, 5 Drawing Sheets

ROTARY LEADTHROUGH OF A ROBOT ARM

CROSS-REFERENCE TO RELATED APPLICATIONS

This application is a 35 USC 371 application of PCT/DE 2004/002554 filed on Nov. 19, 2004.

BACKGROUND OF THE INVENTION

1. Field of the Invention

The invention relates to a rotary leadthrough of a robot arm, in particular of a fourth axle of a Delta robot.

2. Prior Art

Delta robots are known from European Patent Disclosures EP-B 0 250 470, EP-A 1 129 829, and EP-A 1 293 691. These Delta robots are suitable for moving objects precisely and in a guided way in three-dimensional space. They have proven themselves in practice and are used, among other fields, in the food industry or in machining centers that have stringent cleanliness requirements. Cleaning the rotary leadthrough of the fourth axle, however, is sometimes complicated. Until now, this rotary leadthrough has been embodied such that a hollow shaft was supported in a housing, and the shaft had a radial inflation opening in its central void.

Precisely in the aforementioned areas of use, however, it would be desirable to be able to clean the entire robot and especially the region of the rotary leadthrough of the fourth axle better and more simply.

U.S. Pat. No. 5,775,169 moreover discloses a robot arm that is used for manipulation in a vacuum chamber, but that is operated from outside. The robot arm is rotatably supported in a housing, and there is a seal in the housing, for dividing the part of the robot arm toward the vacuum from the part toward the atmosphere.

It is therefore an object of the invention to create a rotary leadthrough for a robot arm, in particular for a fourth axle of a Delta robot, which is constructed simply and is less vulnerable to soiling and which makes good cleaning possible.

SUMMARY OF THE INVENTION

The rotary leadthrough of the invention has a housing and a shaft, located in an axial leadthrough of the housing and supported rotatably in this housing, for connection to the robot arm. The housing has at least two openings for cleaning the axial leadthrough. The shaft, at least in a portion of its length, has a diameter which is less than the diameter of the axial leadthrough in that region, so that there is a void, in particular an annular gap that is open in at least one direction, between the shaft and the axial leadthrough.

The rotary leadthrough can therefore be cleaned easily and without tedious disassembly, by means of a fluid medium, such as water or compressed air. Furthermore, because of its construction, the rotary leadthrough is less vulnerable to soiling. The rotary leadthrough requires relatively few individual parts, making it economical to manufacture and easy to assemble. A further advantage is that the rotary leadthrough can be put together and also secured to the robot without auxiliary tools.

A further advantage is that the shaft can be made relatively slender; that the housing is hollow; and that these parts can be made of lightweight materials. This optimizes the moment of mass inertia of the fourth axle or of the robot arm. This effect is reinforced by the fact that the mass of the shaft is concentrated about the central axis of rotation, and not spaced apart from it as in the prior art.

BRIEF DESCRIPTION OF THE DRAWINGS

The subject of the invention is described below in terms of a preferred exemplary embodiment, which is shown in the accompanying drawings, in which.

DESCRIPTION OF THE PREFERRED EMBODIMENTS

Figure 1:
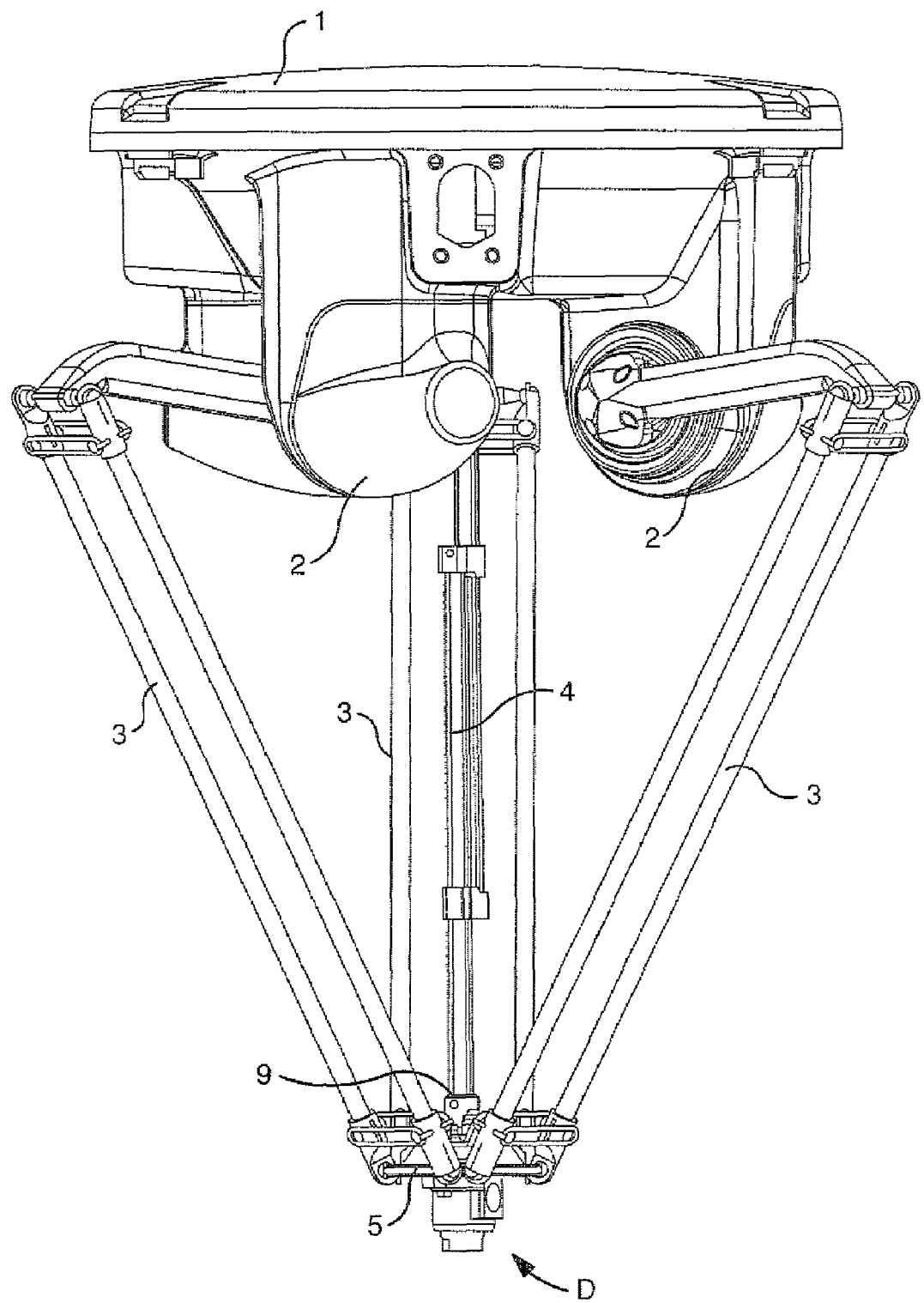
FIG. 1 is a perspective view of a conventional Delta robot.

Except for the rotary leadthrough D described hereinafter, the Delta robot shown in FIG. 1 is equivalent to known Delta robots and has a platelike basic element 1, on which three control arms 3 are supported so as to be pivotable or rotatable. The three control arms 3 can be moved individually by means of motors 2. The free ends of the control arms 3 are pivotably connected to a carrier element, in this case a carrier plate 5. The Delta robot also has a fourth axle 4, which is often telescoping or otherwise changeable in length. This fourth axle 4 is connected to the rotary leadthrough D via a joint 9, in particular a cardan joint or a universal joint. A grasping element, not shown, can be secured to the rotary leadthrough D on the side of the rotary leadthrough D diametrically opposite the fourth axle 4. The type of grasping element depends on the field in which it to be used. Examples of grasping elements are suction cups or clamping means. By means of the three control arms 3, the carrier plate 5 and thus the grasping element can be moved in three-dimensional space. The fourth axle 4 transmits a torque to the grasping element, so that the grasping element can furthermore be rotated purposefully about an axis.

Figure 2:
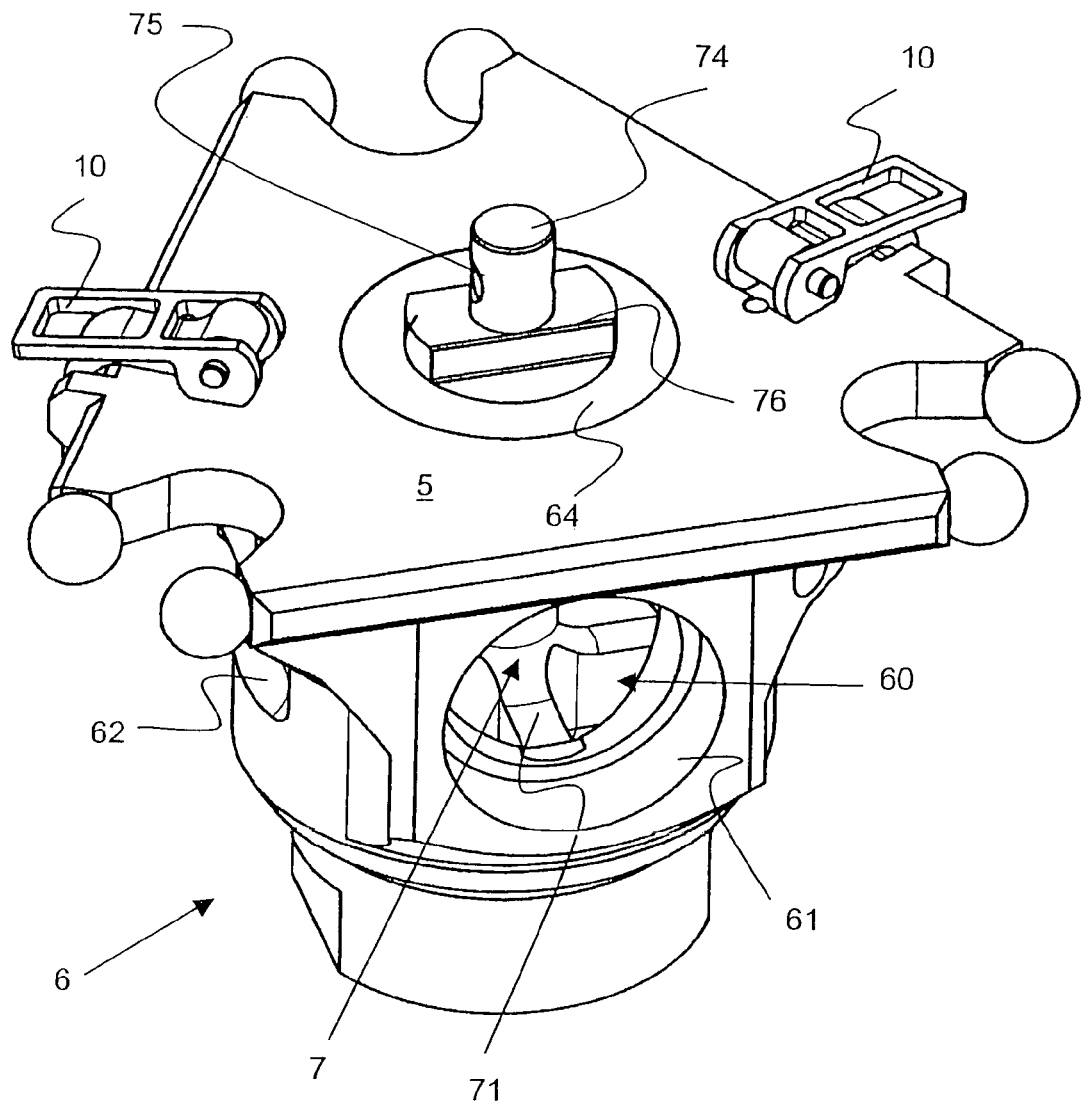
FIG. 2, a perspective view of a rotary leadthrough of the invention, secured to a carrier plate.

In FIG. 2, a rotary leadthrough according to the invention is shown, secured to the carrier plate 5. This view is on a larger scale; the size of the rotary leadthrough can be selected to suit the size of the robot and the field of use, without altering the concept of the invention.

The rotary leadthrough has a housing 6 with an axial leadthrough 60. According to the invention, at least one opening, and here precisely two openings 61, 62 are present, which create a connection from the outside to the axial leadthrough 60 and are preferably located in the radial direction to the axial leadthrough.

The housing 6 has a securing ring 64, which is received in an opening in the carrier plate 5. The outer diameter of the securing ring 64 is preferably equivalent to the inner diameter of the opening in the carrier plate 5.

Figure 5:
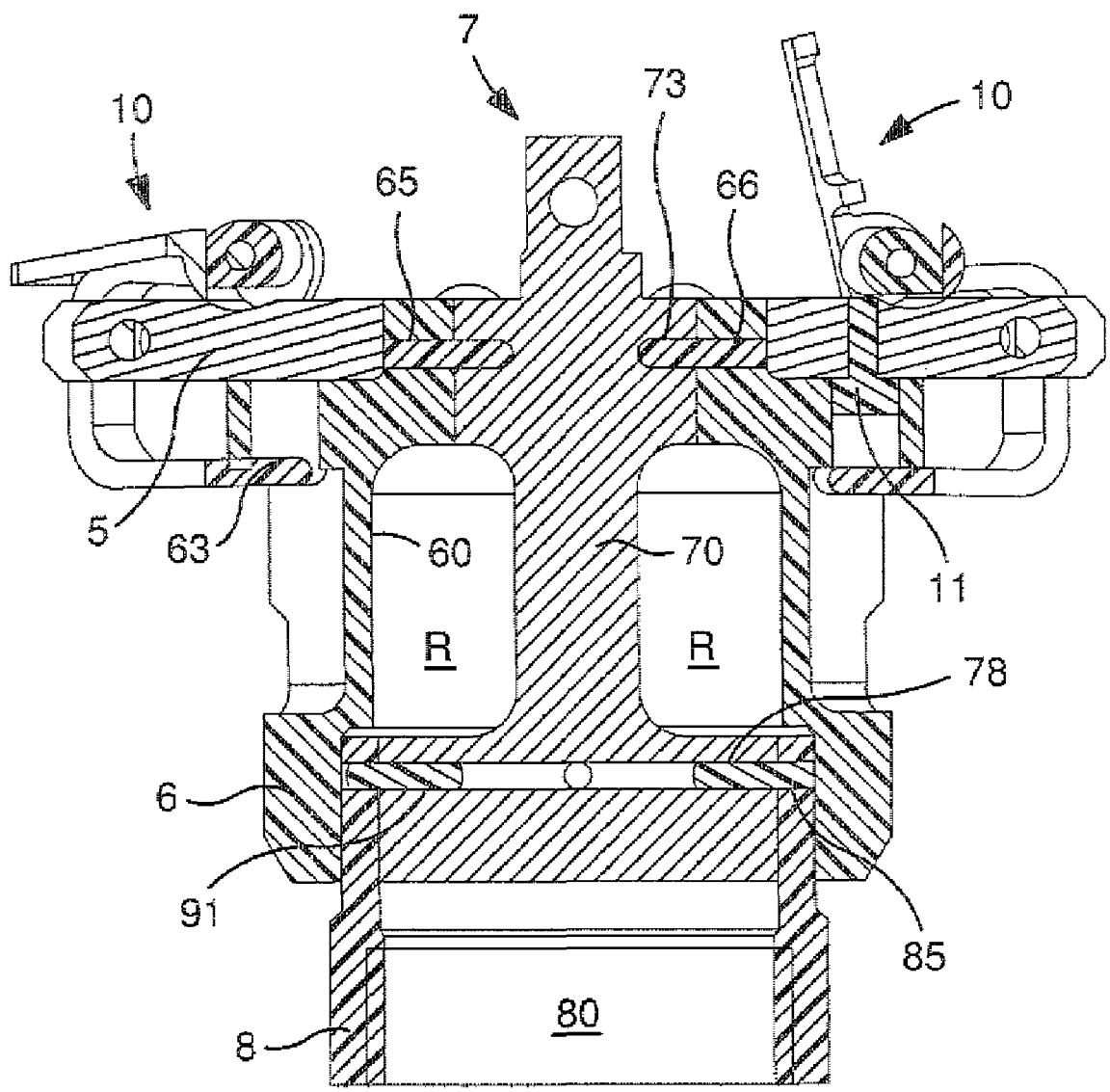
FIG. 5, a first longitudinal section through the rotary leadthrough with the carrier plate of FIG. 2.
Figure 7:
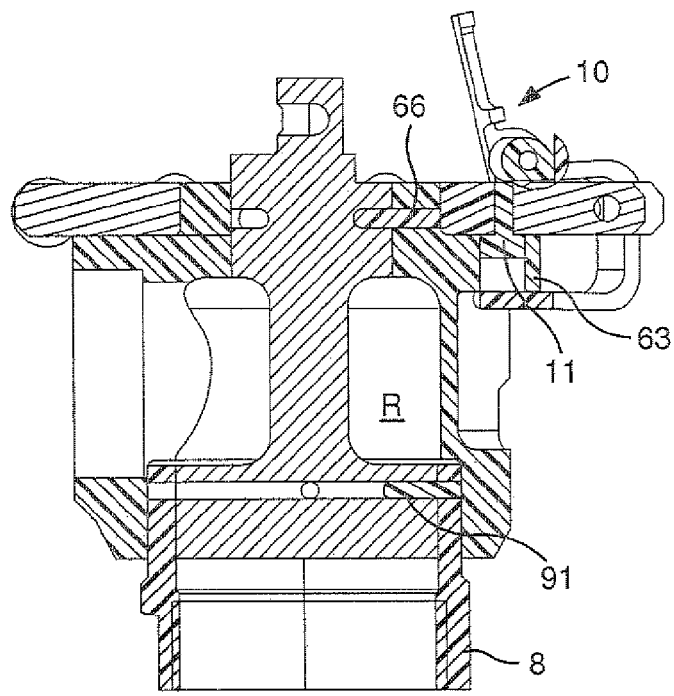
FIG. 7, a third longitudinal section through the rotary leadthrough with the carrier plate of FIG. 2.

The housing 6 can be secured to the carrier plate 5 by means of clamps 10. Alternatively or in addition, connections by means of screws 11 are also possible, as can be seen in FIGS. 5 and 7. For receiving the screws 11 and for securing the clamps 10, the housing 6 has a securing flange 63 (FIGS. 5 and 7), which protrudes past the substantially cylindrical basic body of the housing 6. Securing by means of clamps 10 has the advantage that the rotary leadthrough D can be removed in a simple way, and without auxiliary tools.

The basic body of the housing 6 may also take some other form. The form depends essentially on the field of use. Preferably, the housing 6 is made from plastic, so that it has a relatively low weight and assures good sliding behavior of the shaft in the housing.

A shaft 7 is rotatably supported in the housing 6 and is located in and penetrates the axial leadthrough 60. This shaft serves on the one hand to provide connection to the fourth axle 4 and on the other to provide connection to the grasping element. As can be seen from FIG. 2, shaft 7 protrudes out of the leadthrough 60 with a sliding block 76 and a connection journal 74 on the side toward the carrier plate 5 and also protrudes past the carrier plate 5. Via the sliding block 76, a groove of the universal joint 9 can be displaced, causing the connection journal 74 to protrude into the universal joint 9. The fixation of this connection is done by means of a bolt or pin, which is passed through a bore in the universal joint 9 and through a bore 75, aligned with it, of the connection journal 74. Preferably, an anchor-shaped fixation means, not shown here, is used, which has a resilient curved element and a pin located on the curved element. The curved element can be fitted resiliently over the cylindrical body of the universal joint, whereupon the pin penetrates the bores.

Figure 3:
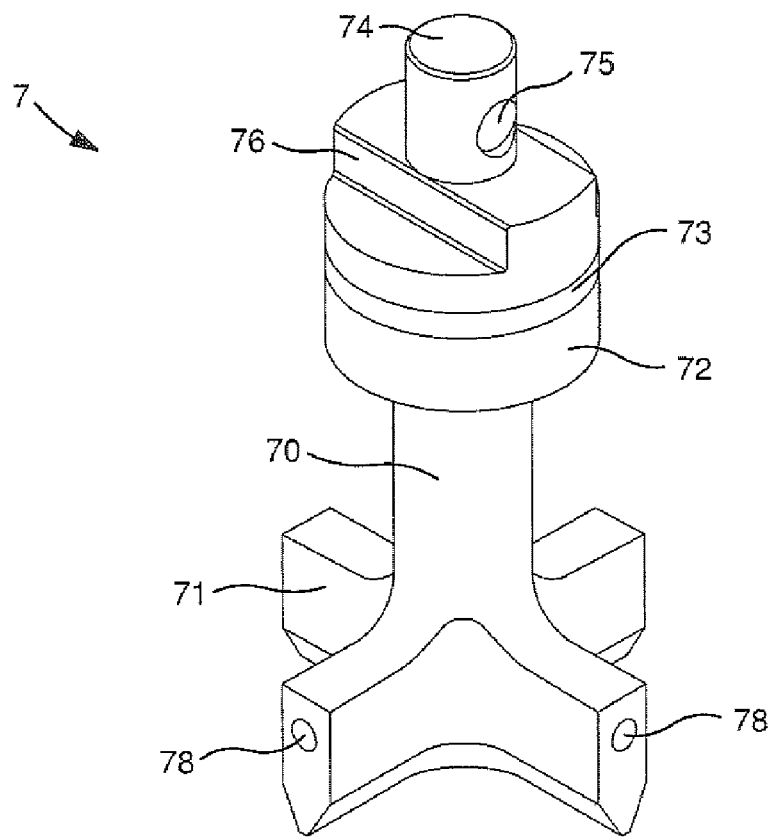
FIG. 3, a perspective view of a shaft of the rotary leadthrough of FIG. 2.
Figure 6:
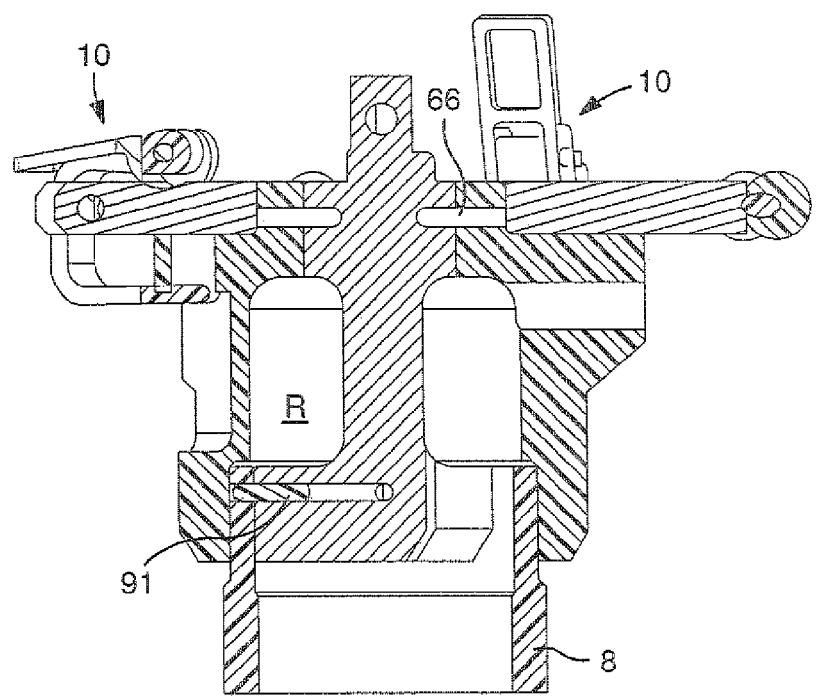
FIG. 6, a second longitudinal section through the rotary leadthrough with the carrier plate of FIG. 2.

The shaft 7 is shown by itself in FIG. 3. It is preferably made from a lightweight material, such as an aluminum alloy. It has an axle 70, which on one end merges with a cylindrical head 72 that has an adjoining journal 74 and on the other end with a star-shaped securing element 71. As a result, as can be seen best from FIGS. 5 through 7, the shaft, over at least a portion of its length, namely the length of its axle 70, has an outer diameter that is smaller than the inner diameter of the axial leadthrough 60. This creates a void, embodied as an annular gap R (see FIGS. 5 through 7), into which the aforementioned radial leadthrough openings 61, 62 lead.

The cylindrical head 72 of the shaft 7 has an encompassing annular groove 73 below the sliding block 76. By means of this annular groove 73, the shaft 7 can be axially supported rotatably in the housing 6. For that purpose, in its securing ring 64, the housing 6 has at least one and in this case two diametrically opposed circular-segment-shaped grooves 65. The cylindrical head 72, in the assembled state, is introduced into an opening in the securing ring 64, in which it is preferably received without play, and its outward-oriented surface is also aligned with the surface of the securing ring 64. In this state, the circular-segment-shaped grooves 65 and the annular groove 73 are in the same plane with one another. The axial position of the shaft 7 can now be fixed by thrusting segmental disks 66, preferably also made of plastic, into the circular-segment-shaped grooves 65 until they engage the annular groove 73. This can be seen best in FIGS. 5 through 7. In the installed state of the housing 6 in the carrier plate 5, the segmental disks 66 rest on the side walls of the opening in the carrier plate 5 and are thus secured by it.

Figure 4:
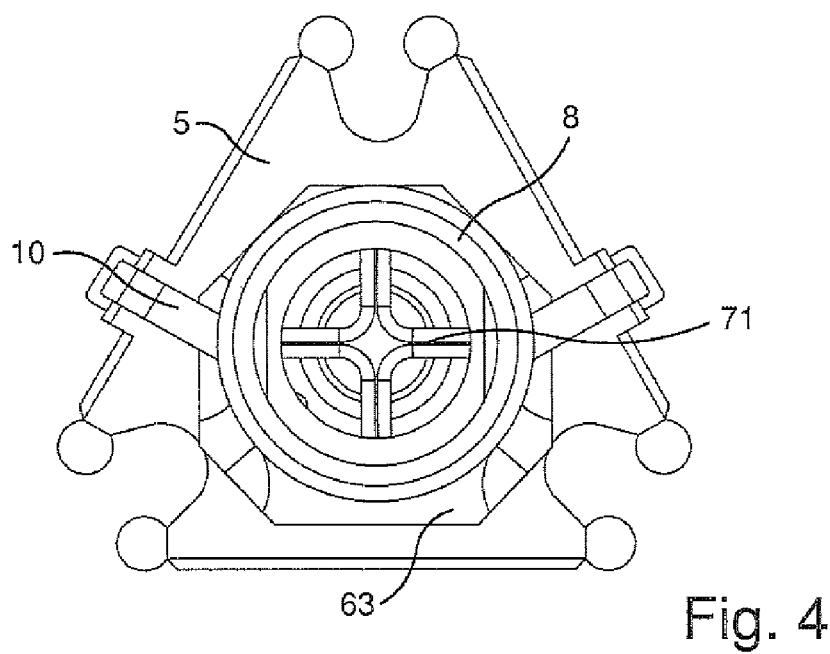
FIG. 4, a top plan view of the rotary leadthrough with the carrier plate of FIG. 2 from below.

An intermediate member 8, which is joined to the star body 71 of the shaft 7, is also visible in these drawings. The intermediate member 8 is joined to the shaft by pins 91 inserted into radial bores 78 disposed in the star-shaped body portion of the shaft 7 and through radial holes 85 disposed in the intermediate member 8. The shape of the intermediate member depends on the type of grasping element used. Preferably, however, it also has an axial through opening 80, so that the annular gap R has a connection to the outside in this direction. This can be best seen in FIG. 4. The star body 71 has the advantage that, while it makes sufficient stability and simple securing possible, nevertheless it reduces the inside cross section as little as possible.

The aforementioned radial openings now enable simple cleaning of the rotary leadthrough D, and in particular of the annular gap R, by means of a fluid medium, such as water, a cleaning solution, or compressed air. A first one of the openings 61 is a suction extraction opening, and a second opening 62 is an inflation or flushing opening. Preferably, the suction extraction opening 61 has a larger diameter than the inflation opening 62. Preferably, the two openings 61, 62 are also disposed at an angle of at least approximately 90° to one another. They may be located at the same height or at different heights.

The rotary leadthrough of the invention finds its preferred field of use, as described above, upon the leadthrough of a fourth axle of a Delta robot or similar robot. However, its use with robot arms of robots of other designs is also possible and is also part of the concept of the invention.

The foregoing relates to preferred exemplary embodiments of the invention, it being understood that other variants and embodiments thereof are possible within the spirit and scope of the invention, the latter being defined by the appended claims.

The invention claimed is:

1. A rotary leadthrough of a fourth axle of a Delta robot arm, the rotary leadthrough comprising
   a housing,
   a shaft located in an axial leadthrough of the housing and is rotatably supported in the housing, for connection to the robot arm, and
   at least two openings in the housing which provide direct access into the axial leadthrough from outside the housing for cleaning the axial leadthrough, one of the at least two openings being a flushing opening and one of the at least two openings being a suction opening,
   the shaft having a reduced diameter extending over a portion of its length, which diameter is less than the diameter of the axial leadthrough in a corresponding region of the axial leadthrough, thereby providing a void between the shaft and the axial leadthrough.

2. The rotary leadthrough in accordance with claim 1, wherein the at least two openings are located in a radial direction to the axial leadthrough.

3. The rotary leadthrough in accordance with claim 2, wherein the shaft further comprises a connection journal on one end, for securing to a joint, and a securing element, on a diametrically opposite end, for securing a grasping element.

4. The rotary leadthrough in accordance with claim 3, wherein the securing element comprises a star-shaped body portion.

5. The rotary leadthrough in accordance with claim 2, wherein a first of the at least two openings is a suction opening, and at least a second of the least two openings is a flushing opening, and wherein the suction opening has a larger diameter than the flushing opening.

6. The rotary leadthrough in accordance with claim 5, wherein the suction opening and the flushing opening are located at an angle of at least approximately 90° to one another.

7. The rotary leadthrough in accordance with claim 1, wherein the void is an annular gap.

8. The rotary leadthrough in accordance with claim 1, wherein the shaft further comprises a connection journal on one end, for securing to a joint, and a securing element, on a diametrically opposite end, for securing a grasping element.

9. The rotary leadthrough in accordance with claim 8, wherein the securing element comprises a star-shaped body portion.

10. The rotary leadthrough in accordance claim 1, wherein the housing is made of plastic and/or the shaft is made from an aluminum alloy.

11. A rotary leadthrough of a fourth axle of a Delta robot arm, the rotary leadthrough comprising
a housing,
a shaft located in an axial leadthrough of the housing and is rotatably supported in that housing, for connection to the robot arm, and
at least one opening in the housing for cleaning the axial leadthrough, the shaft having a reduced diameter extending over a portion of its length, which diameter is less than the diameter of the axial leadthrough in a corresponding region of the axial leadthrough, thereby providing a void between the shaft and the axial leadthrough,
wherein the housing comprises a cylindrical securing ring, which on at least one side has a radial groove; wherein the shaft comprises an annular groove, which is aligned with the at least one radial groove in the same plane; and wherein the rotary leadthrough comprises at least one disk, which can be brought into engagement with one each of the at least one radial groove and the annular groove for rotatably supporting the shaft in the housing.

12. The rotary leadthrough in accordance with claim 11, wherein the annular groove is located in a cylindrical head portion of the shaft, and wherein the cylindrical head has an outer diameter which corresponds to an inner diameter of the securing ring.

13. The rotary leadthrough in accordance with claim 12, wherein the shaft further comprises a connection journal on one end, for securing to a joint, and a securing element, on a diametrically opposite end, for securing a grasping element.

14. The rotary leadthrough in accordance claim 12, wherein the housing is made of plastic and/or the shaft is made from an aluminum alloy.

15. The rotary leadthrough in accordance with claim 11, wherein the shaft further comprises a connection journal on one end, for securing to a joint, and a securing element, on a diametrically opposite end, for securing a grasping element.

16. The rotary leadthrough in accordance claim 11, wherein the housing is made of plastic and/or the shaft is made from an aluminum alloy.

17. The rotary leadthrough in accordance with claim 11, wherein a first of the at least two openings is a suction extraction opening, and at least a second of the least two openings is an inflation opening, and wherein the suction extraction opening has a larger diameter than the inflation opening.

18. The rotary leadthrough in accordance with claim 17, wherein the suction extraction opening and the inflation opening are located at an angle of at least approximately 90° to one another.

19. A rotary leadthrough of a fourth axle of a Delta robot arm, the rotary leadthrough comprising
a housing,
a shaft located in an axial leadthrough of the housing and is rotatably supported in that housing, for connection to the robot arm, and
at least one opening in the housing for cleaning the axial leadthrough, the shaft having a reduced diameter extending over a portion of its length, which diameter is less than the diameter of the axial leadthrough in a corresponding region of the axial leadthrough, thereby providing a void between the shaft and the axial leadthrough, wherein at least two openings are located in a radial direction to the axial leadthrough; wherein the housing comprises a cylindrical securing ring, which on at least one side has a radial groove; wherein the shaft comprises an annular groove, which is aligned with the at least one radial groove in the same plane; and wherein the rotary leadthrough comprises at least one disk, which can be brought into engagement with one each of the at least one radial groove and the annular groove for rotatably supporting the shaft in the housing.

20. The rotary leadthrough in accordance with claim 19, wherein the annular groove is located in a cylindrical head portion of the shaft, and wherein the cylindrical head has an outer diameter which corresponds to an inner diameter of the securing ring.

* * * * *